United States Patent Office 2,745,786
Patented May 15, 1956

2,745,786
METHOD OF PRODUCING STABLE
THEOPHYLLINIC AEROSOLS

Jacques Baisse, Paris, France, assignor to Societe Promidel, Courbevoie, France, a corporation of France No Drawing. Application April 2, 1952,
Serial No. 280,170

6 Claims. (Cl. 167—67)

The application of theophyllinic aerosols has already been proposed, starting from various alkaline solutions and combinations of theophylline such as aminophylline.

Such solutions show however the drawback of being highly alkaline with a pH ranging at about 10, without it being possible to modify this value unless the theophylline is precipitated.

Furthermore, the carbon dioxide present in the atmosphere is sufficient for producing in the apparatuses a precipitation of theophylline which leads to a clogging and consequently to the impossibility of using the product in practice.

Lastly the high alkalinity of the solutions causes the product obtained to be inconsistent with various pharmaceutical compositions. For instance, it is impossible to incorporate to the aerosols any alkaloids in the state of salts or again certain local synthetic anaesthesics the base of which is not soluble or only sparingly soluble in an alkaline medium.

It is possible to solve this problem of the therapeutic use of theophyllinic aerosols by using a salt of theophylline ethanoic acid. As a matter of fact, such salts of theophylline ethanoic acid are stable in a neutral medium and their solutions may be easily brought to neutrality. Better still, as the acid is itself slightly soluble, the solutions may, if required, be adjusted to a pH value slightly under 7.

Carbon dioxide has no action on such solutions and no clogging is any longer to be feared with such non-alkaline solutions of theophylline in the form of such derivative of theophylline ethanoic acid.

The impossibility of associating certain pharmaceutical products with theophyllinic aerosols is thus removed and, as most salts of alkaloid and synthetic bases with theophylline ethanoic acid are soluble, it becomes an easy matter to introduce such substances into the prescriptions.

Lastly the total absence of chemical activity of such solutions allows introducing into same, in the form of a colloidal suspension and with the assistance of a protective colloid, neutral water-insoluble substances having a high therapeutic value such as eucalyptol for instance.

A compound prescription of this type is given hereinafter:

| | Gram |
|---|---|
| Theophylline ethanoate of piperazine | 100 |
| Glycerol | 75 |
| Ethylic alcohol | 25 |
| Eucalyptol | 6 |
| Procaine | 5 |
| Gelatine | 1 |

The aerosols obtained are stable during more than one hour and the viscosity and solubility of the solution is considerable.

What I claim is:

1. In a method for producing stable theophyllinic aerosols, the steps consisting in dissolving in water a solution having a pH less than 7 of a derivative of theophylline ethanoic acid and producing therewith an aerosol inert against the action of carbon dioxide.

2. In a method for producing stable theophyllinic aerosols, the steps consisting in dissolving in water a solution having a pH less than 7 of theophylline ethanoic acid and producing therewith an aerosol inert against the action of carbon dioxide.

3. In a method for producing stable theophyllinic aerosols, the steps consisting in dissolving in water a solution having a pH less than 7 of a neutral salt of theophylline ethanoic acid and producing therewith an aerosol inert against the action of carbon dioxide.

4. In a method for producing stable theophyllinic aerosols, the steps consisting in dissolving in water a solution having a pH less than 7 of a derivative of theophylline ethanoic acid, thereby forming a chemically unreactive solution, and incorporating thereto a pharmaceutical substance that is normally insoluble in an alkaline medium and producing therewith an aerosol inert against the action of carbon dioxide.

5. In a method for producing stable theophyllinic aerosols, the steps consisting in dissolving in water a solution having a pH less than 7 of a derivative of theophylline ethanoic acid, thereby forming a chemically unreactive solution, and incorporating thereto a neutral water-insoluble medicinal substance and a protective colloid and producing therewith an aerosol inert against the action of carbon dioxide.

6. In a method for producing stable theophyllinic aerosols, the steps consisting in dissolving in water a solution having a pH less than 7 of piperazine theophylline ethanoate and producing therewith an aerosol inert against the action of carbon dioxide.

References Cited in the file of this patent

UNITED STATES PATENTS

| 2,222,952 | Mothes | Nov. 26, 1940 |
| 2,594,296 | Dautrebande | Apr. 29, 1952 |

FOREIGN PATENTS

| 157,575 | Austria | Dec. 11, 1939 |

OTHER REFERENCES

Lesser: "Aminophylline," Drug and Cosmetic Industry, Mar. 1950, pages 276, 277 and 340–346.

Greenbaum: "New Water Soluble Theophylline Compound," Am. J. Pharm., Nov. 1937, pages 550–554.

Wyss: Merck Report, April 1945, pages 16–18.

Euratmos Pamphlet, pages 2, 20 (May–June 1949).

Chemical Abstracts, volume 44 (1950), 7997.